United States Patent [19]

Sauder

[11] 4,387,030
[45] Jun. 7, 1983

[54] FLUID SEPARATION SYSTEM

[76] Inventor: Larry D. Sauder, Rte. 2, Box 545, Lockport, La. 70374

[21] Appl. No.: 275,195

[22] Filed: Jun. 19, 1981

[51] Int. Cl.³ .............................................. B01C 2/10
[52] U.S. Cl. .................................... 210/774; 210/800; 210/170; 210/540
[58] Field of Search ............... 210/170, 187, 540, 774, 210/803, 800, 533, 536, 538; 166/54, 68, 105

[56] References Cited

U.S. PATENT DOCUMENTS

| | | | |
|---|---|---|---|
| 1,748,141 | 2/1930 | Davitt et al. | 210/540 |
| 2,152,863 | 4/1939 | Bills | 210/187 X |
| 3,762,548 | 10/1973 | McCabe | 210/170 |
| 3,862,039 | 1/1975 | Summers | 210/170 X |
| 4,230,422 | 10/1980 | Brown et al. | 210/170 X |
| 4,252,649 | 2/1981 | Favret, Jr. | 210/170 X |

Primary Examiner—Frank A. Spear, Jr.
Attorney, Agent, or Firm—LeBlanc, Nolan, Shur & Nies

[57] ABSTRACT

A system for separating two immiscible fluids of different densities. An outer conduit extends down from the earth's surface at least to a depth determined as a function of the average difference between the weights of the two fluids to be separated. An inner conduit extends down from the earth's surface inside the outer conduit and terminates above the bottom of the outer conduit so as to be in open communication with the space defined in the outer conduit. A mixture of two immiscible fluids is supplied to one of the conduits and the system is kept under sufficient pressure to maintain a defined fluid separation region within the one conduit such that the lower limit of the fluid separation region, below which occurs substantially only the heavier of the two immiscible fluids, is maintained above the lower end of the inner conduit. The maintained pressure is sufficient to supplement the weight of the lighter fluid to overcome the weight of the heavier fluid and force the heavier fluid to flow out through the other conduit.

19 Claims, 4 Drawing Figures

FLUID SEPARATION SYSTEM

BACKGROUND OF THE INVENTION

The present invention relates to a system for separating fluids. More particularly, the invention relates to a system for separating fluids of different densities. The invention is primarily, but not exclusively, directed to a system for separating oil from water and sediment to reclaim and recycle used oil.

The present invention makes use of the fact that a mixture of two liquids of different densities will have a tendency to separate; the heavier liquid will sink and the lighter liquid will rise above the heavier liquid. The amount of separation of the two liquids depends, in part, on the differences in their densities. The greater the differences in density, the more clearly defined will be the separation between the liquids.

The present invention is particularly suited to the separation of oil and water for reclamation purposes. During the various stages of processing, transporting and storing oil, impurities, primarily including water but also including metals, dirt, etc., tend to mix with the oil. Mixing occurs to a greater or lesser degree depending on such factors as the density of the oil, temperature of the mixture, amount of agitation (e.g., due to wave action) to which the mixture is subjected, and rates of flow through a pipeline.

State-of-art methods for separating oil and water mixtures depend on the difference in the densities of the water and oil or other suspended matter present to effect physical separation. The primary processing techniques available are settling (i.e., gravity separation), centrifugation, demulsification (with heat and/or chemicals), and distillation.

Settling is the simplest technique that can be applied to the separation of water from oily waste mixtures. The effectiveness of the settling technique for separating oil-water mixtures depends on the amount of oil contaminant present as globules and the size of these globules. Gravity separation will not remove oil dissolved in water. Though inherently simple, the gravity separation technique is also basically slow and very long residence times may be required to remove small globules of oil.

Centrifugation utilizes the centrifugal force developed by rapid rotation of a system to enhance the settling rates of oil globules and solid matter suspended in water. Oil-water separation by centrifugation is only practical when the oil and/or solids contaminants are present in relatively high concentrations. Centrifugation is also generally ineffective in removing highly stabilized emulsions of oil in water (though some emulsions may be broken by centrifugation) or oil dissolved in water. Its application to the processing of oily wastes depends on the specific nature of the wastes concerned, their concentration, variability, etc.

The breaking of stable oil-water emulsions can be an important primary processing step in the treatment of some oily wastes. In the presence of stabilizing chemical dispersants such as used in bilge cleaners, simple settling or even centrifugation may not be able to effect oil-water separation. Under these conditions, other special physical or chemical processing techniques can be used.

The less stable emulsions can often be broken by physical techniques such as heating. This is the simplest and least expensive approach. Heating reduces oil viscosity, melts waxy interfacial films and promotes coalescence and separation of the oil and water phases. Simultaneous application of heat and centrifugation (or filtration) may be required to separate emulsions of comparatively high stability.

Very stable emulsions (which fail to yield to physical methods alone) must be treated chemically to aid the physical processes. Chemical demulsifiers work primarily by the neutralization of stabilizing electrical charges and alteration of the system hydrophyllic/lipophillic balance (HLB). There are many chemical demulsifiers on the market. The selection of which type of chemical demulsifier to use will depend on the specific character of the emulsion to be treated and the nature of the active stabilizing agents present.

Most oily wastes (on the order of 90%) can be satisfactorily treated using one or more processes involving gravity separation, heat, and centrifugation. Chemicals are generally used only where needed and other techniques are not sufficient.

Gravity separation, heat, and centrifugation can produce oil having a BS&W (bottoms, sediment, and water) of less than 0.1%. Overall, therefore a process involving gravity, heat, and centrifugation will produce oil of the highest quality and the least amount of oily sludge. The other processes will produce oil having lower overall quality and higher sludge levels. The process most effective in breaking emulsions will probably produce the least amount of oily sludge, since oily sludge is no more than a highly stable emulsion containing a fairly high solids content.

Oil separated out of the residue mixture or the drawn off water and containing 2% or less of residue BS&W can be recycled and returned to the commercial product stream. Prior art separation techniques are generally time consuming (in the case of settling tanks), or expensive (due to cost of the centrifuges, chemicals, and related equipment), or have other problems which make them commercially impractical or expensive.

The present invention provides a cost effective way to separate oil out of oil/water residue and to reclaim oil having as little as 0.5% or less BS&W. The invention provides a relatively high rate and degree of separation without the expensive or moving parts of a mechanical centrifuge. Also, the present invention is less likely to become clogged with trash than mechanical centrifuges.

SUMMARY OF THE INVENTION

The invention described in more detail below relates to a system and related method for separating two immiscible fluids of different densities. The structural features include an outer conduit extending down from the earth's surface at least to a depth determined as a function of the average difference between the densities of the two fluids to be separated, the outer conduit being effectively sealed at the top and bottom to define a fluid space therewithin. An inner conduit extends down from the earth's surface inside the outer conduit, the lower end of the inner conduit terminating above the bottom of the outer conduit to be in open communication with the space defined within the outer conduit. A mixture supply source is connected to one of the conduits for supplying a mixture of two immiscible fluids to that conduit. A heavy fluid outlet is connected to the other conduit for removing the heavier (more dense) fluid separated out of the fluid mixture.

The system is kept under sufficient pressure to maintain a defined fluid separation region within the one conduit such that the lower limit of the fluid separation region, below which occurs substantially only the heavier of the two immiscible fluids, is maintained above the lower end of the other conduit. The system pressure is further sufficient to supplement the weight of the lighter (less dense) fluid to overcome the weight of the heavier fluid and force the heavier fluid to flow out through the fluid outlet connected to the other conduit. The lighter of the two fluids is drawn out from above the upper limit of the fluid separation region, above which occurs substantially only the lighter of the two immiscible fluids.

In one embodiment the fluid mixture is supplied to the inner conduit and the heavy fluid outlet is connected to the surface end portion of the outer conduit. In another embodiment the fluid mixture is supplied to the outer conduit and the heavy fluid outlet is connected to the surface end portion of the inner conduit.

In a still further embodiment, an intermediate conduit extends down from the earth's surface inside the outer conduit, terminating above the bottom of the outer conduit to be in open communication with the space defined within the outer conduit. The inner conduit extends down inside the intermediate conduit and opens into the intermediate conduit. The mixture of two immiscible fluids is supplied to the inner conduit; a fluid outlet is connected to the surface end portion of the outer conduit for removing the heavier fluid separated out of the fluid mixture. A storage tank is coupled to the surface end portion of the intermediate conduit and the lighter fluid is drawn off from above the upper limit of the fluid separation region to and into the storage tank.

A steam line may extend down from the earth's surface inside the inner conduit to heat the fluid mixture and facilitate separation.

System pressure may be obtained by using the force of gravity directly. Thus the mixture supply source may include a storage tank (e.g., such as in a tank farm) into which the fluid mixture can be loaded to a sufficient height to exert the desired pressure on the fluid in the below ground conduits.

Other features and advantages of this invention will be apparent from the following description of the preferred embodiment.

DESCRIPTION OF THE PREFERRED EMBODIMENTS

The basic operational principles of this invention are described below with reference to FIG. 1. A conduit or casing 12 lines a hole dug in the earth's surface and extends downwardly to a depth of, for example, 500 feet or more. This depth is determined at least in part by the weight differential between water and the average type of oil to be processed in the system. Casing 12 lines the sides and bottom to seal the interior space or "well" 10 from the surrounding earth. A fluid-tight cover 13 seals the top of casing 12.

A conduit 14 extends through cover 13 into the region 10 a substantial distance. Conduit 14 extends above the surface and opens into a tank 16. A shutoff valve 18 is located in conduit 14 upstream of its outlet end 14b.

A storage/separator tank 20 communicates with the interior space or well 10 through a valved conduit 22 containing a shutoff valve 24. Conduit 22 communicates the bottom portion of tank 20 with the top portion of region 10 through casing 12. A supply inlet 26 is connected through a valved conduit 28 with an oil/water residue source, such as a tank, conduit, etc. An outlet conduit 30, containing an adjustable restrictor/shutoff valve 32, communicates the top portion of tank 20 with a reclaimed oil storage tank or transmission line (not shown). A valved inlet port 34 is provided for injecting high pressure water into the well 10 as needed. During normal operation, valved inlet 34 is maintained closed.

The length of conduit 14 should be sufficient to maximize the effective height of the fluid separation region (denominated between lines B-C in FIG. 1) while maintaining an adequate spacing from the bottom of well 10 to avoid constant clogging of the inlet end 14a of conduit 14 by solid sediment (e.g., rust, sand, etc.) contained in the residue mixture. FIG. 1A is an enlarged view of the inlet end 14a of conduit 14 showing a slot 15 formed in the lower part of conduit 14. The purpose of slot 15 will be described below.

The system of this invention is primarily to be used for reclaiming so-called "slop oil". Slop oil is taken from the bottoms of tanks and usually has solids, such as rust, tank bottoms, sand, etc. in it. These solids tend to sink to the bottom of well 10; some, especially the lighter or smaller particulates may be carried along with the water into conduit 14 if there is sufficient pressure in well 10. After a time, the accumulation of collected solids may stop the flow of water into conduit 14. Slot 15 is provided in conduit 14 to permit water to flow into the conduit 14 even if inlet end 14a is blocked by accumulated solids. If it becomes necessary to flush out the system, valve 24 is closed and a high pressure water supply is connected to valve inlet 34. The increased water pressure in well 10 forces the accumulated solids up through conduit 14 and into the tank 16. Thereafter, valve 34 is closed, valve 24 is reopened and normal operation resumes.

The system shown in FIG. 1 operates as follows. Initially, well 10 and the inside of tank 20 are in open communication through conduit 22 and open valve 24. The system is first charged with clean water through supply conduit 28 and inlet 26. The water, under pressure, charges the interior of tank 20, well 10 and conduit 14. With valve 18 open, the initial charge will completely fill well 10 and conduit 14 and will fill tank 20 to about line A (the uppermost vertical extension of conduit 14). Once the system is charged, the oil/water residue mixture is then pumped under pressure into tank 20 and well 10 through conduit 28.

The volumetric capacity of conduit 14 is less than that of well 10. Thus, if the fluid input rate at inlet 26 is greater than the outflow rate into conduit inlet 14a, the fluid in the system will rise to fill storage tank 20. Inside tank 20 and well 10, the oil/water residue mixture separates; the lighter oil rises and the water and sediment settles toward the bottom of well 10 by gravity.

Figures 1, 1A:
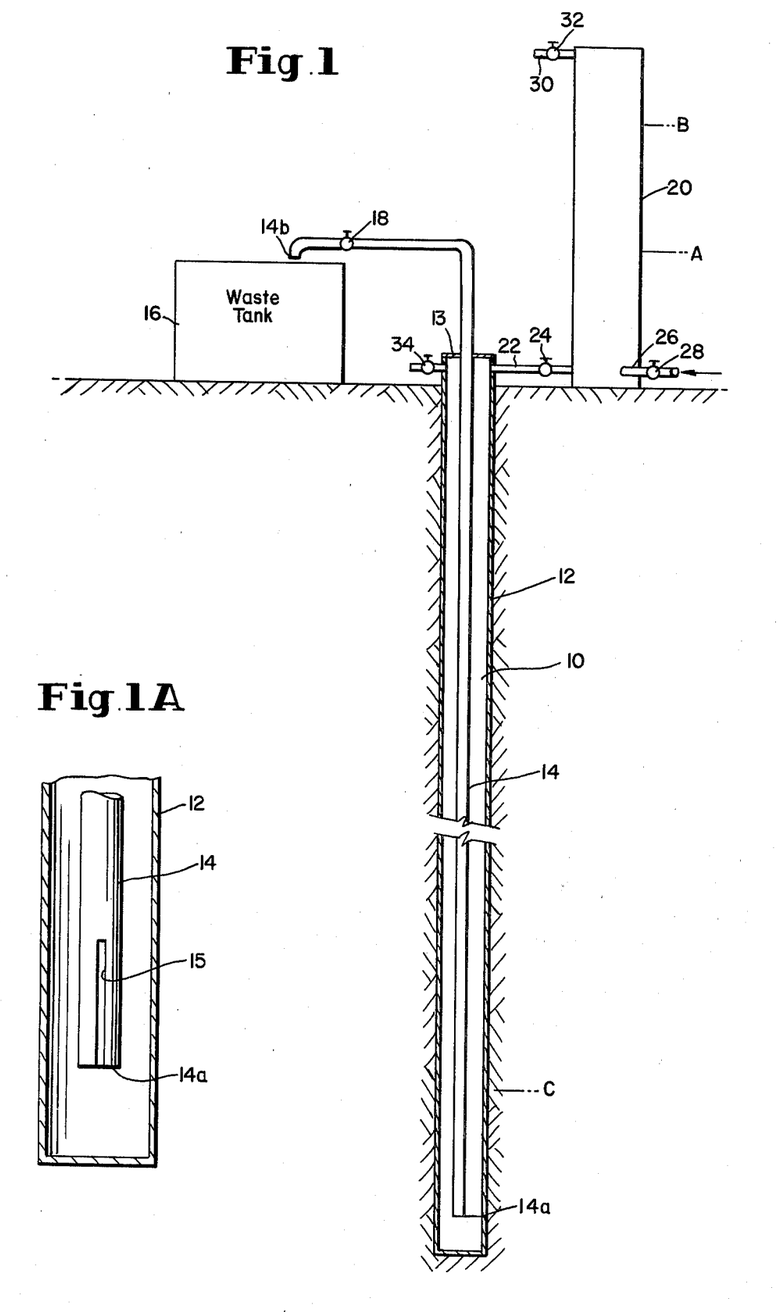
FIG. 1 shows one embodiment of the fluid separation system of this invention.
FIG. 1A shows a detail of a portion of the outlet conduit.

Referring to FIG. 1, the fluid above line B will be reclaimable oil (2% or less, BS&W); similarly, fluid below line C will consist of water and sediment, containing essentially no oil. The fluid in the region between lines B and C contains an oil/water mixture gradient; the length of space B-C will vary as a function of the density and volume of the oil mixed with the water. The distance between lines B and C increases with the density and volume of oil mixed with the water.

As the oil and water separate, the weight of the oil rising toward the top of tank 20 causes mixture region B-C to shift downwardly. A sufficient weight of oil (above line B) and oil/water mixture (in region B-C) will cause water below line C to flow into and up through conduit 14 and out into tank 16.

When a sufficient amount of clean oil has been separated above line B, following initial start up, valve 32 may be opened to draw off the reclaimed oil. The flow of oil through valve 32 is controlled to adjust the pressure in tank 20 and thereby maintain line C above inlet end 14a of conduit 14 and line B below outlet conduit 30. The oil/water mixture is thereafter continuously pumped into the system under sufficient pressure to keep tank 20 full and maintain the maximum permissible flow rate through the system. The maximum capacity of the system to separate out and reclaim oil of 2% or less BS&W is in part a function of the maximum available length of the fluid mixture region B-C; a further consideration may be the fluid carrying capacity of outflow conduit 14. Only a nominal amount of pumping pressure is needed since the weight of the oil/water mixture in region B-C and oil above line B is generally sufficient to maintain a flow of water into and up through conduit 14 to outlet 14b.

The addition of heat to the system will produce an increase in the separation rate of the oil/water mixture. The oil/water mixture may be heated either upstream of supply inlet 26 or in tank 20, or in well 10. It is especially desirable to heat heavy, low gravity oil to thin its viscosity so that it becomes more buoyant. Commercially available heaters generally have a predetermined maximum heating capacity (e.g., 200 bbl/hr); this can become a limiting factor which determines the system capacity.

In one example, casing 12 has a 12 in. I.D. (inside diameter) and conduit 14 has a 7 in. I.D. Well 10 has a depth of 1,000 ft. The bottom of conduit 14 is spaced about 2 ft. above the bottom of well 10, the top of conduit 14 extends 9 ft. above the surface and tank 20 has a height of about 48 ft. Fluid is pumped into the system under pressure (preferably and advantageously less than about 15 psig).

Figure 2:
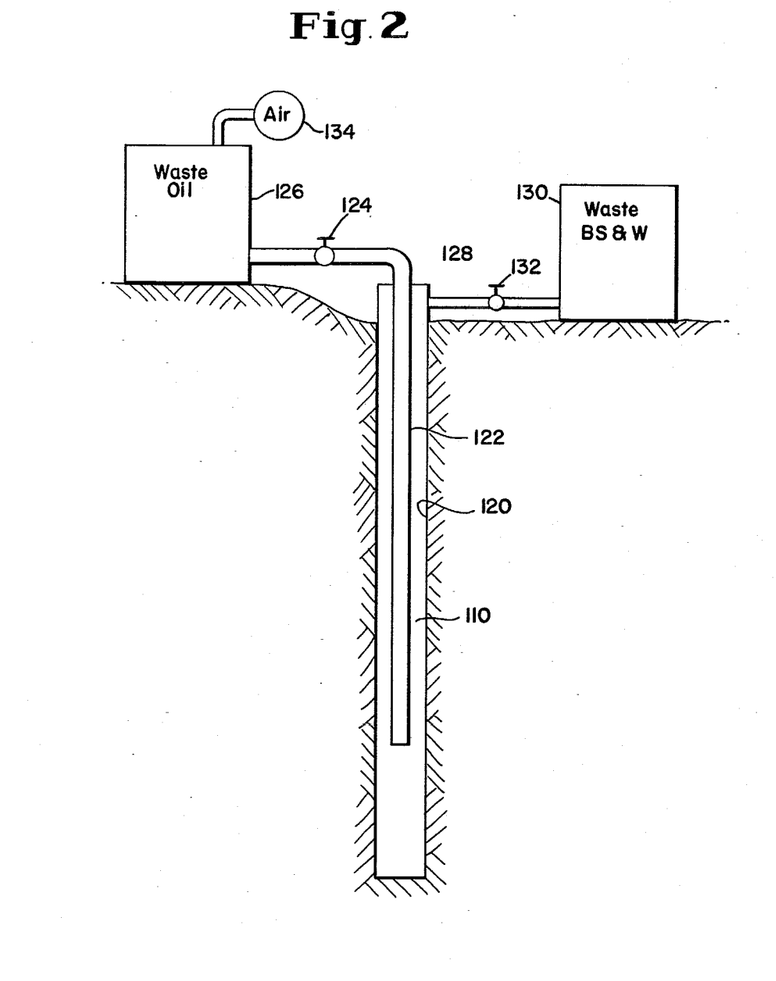
FIG. 2 shows a test set up constructed in accord with the basic operating principals of the invention.

FIG. 2 shows an embodiment constructed to test the basic operating principles of the invention. This embodiment differs in construction but not in concept from the embodiment in FIG. 1. In the test setup, a 5 in. I.D. conduit or casing 120 was sunk into a played out well to a depth of about 2,600 ft. A $2\frac{7}{8}$ in. I.D. tubing 122 extended downwardly was connected through a valve 124 to holding tank 126. A conduit 128 communicated the interior of casing 120 with a waste water tank 130 through a valve 132.

The length of tubing 122 is based on the difference in the densities of oil and water. Water exerts a pressure of 0.434 psi per foot. The heaviest grade of oil (16 to 18 gravity oil) weighs about 8 lbs per gallon and exerts a force of about 0.416 psi per foot. When the system is initially charged with water, the water pressure at the bottom of conduit 122 is about 964 psi. Therefore, a pressure greater than 964 psi is needed to cause water to flow up and out of casing 120 into tank 130.

Following initial charging, 200 bbl of waste oil having a specific gravity of 18 and 30% BS&W was loaded into holding tank 126. If conduit 122 were filled with 18 gravity oil, the pressure at the bottom of the conduit would be about 924 psi. Since oil is lighter than water, a positive pressure must be added to holding tank 126 to initiate flow of BS&W into waste tank 130. The fluid separation region (corresponding to region B-C in FIG. 1) is maintained within tank 126 and conduit 122 such that the lower end of the region is kept above the bottom of conduit 122.

In actual test conditions, pressurized air at about 39 psi was supplied from a source 134 into holding tank 126; this condition was maintained for 24 hours. No heat or chemicals were added to the waste oil. After 24 hours, 56 bbl of BS&W had flowed into waste receiver tank 130, leaving 144 bbl of oil with 2% waste in the holding tank 126.

Figure 3:
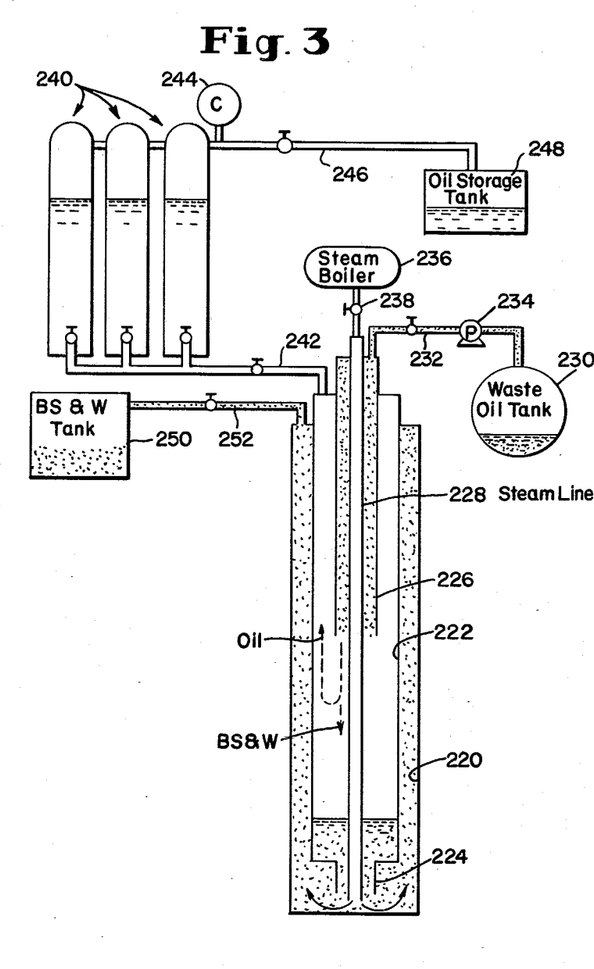
FIG. 3 shows a further embodiment incorporating additional features into the basic operating concept of the invention.

FIG. 3 shows a further embodiment of the invention incorporating means for adding heat to the system to further improve the quality of the reclaimed product. In this embodiment an outer conduit or casing 220 lines a hole in the ground. An intermediate conduit 222 extends into casing 220 to a depth dependent on the average difference in density between water and the type of oil to be processed. Conduit 222 preferably has a nipple 224 at its bottom end. A third conduit 226 extends downwardly inside conduit 222. A steam line 228 extends downwardly inside conduit 226 preferably to a depth between the bottoms of casing 220 and conduit 222.

A waste oil supply tank 230 communicates with conduit 226 through a valved conduit 232 and a pump 234. A steam boiler 236 communicates with steam line 228 through a valved conduit 238; steam boiler 236 is sized to deliver steam into the well at approximately 300° F. One or more pressure cylinders 240 communicates in parallel with the inside of conduit 222 through a valved conduit 242. A compressor 244 is connected to generate up to about 40 psi on the pressure cylinders 240. A valved conduit 246 communicates the pressure cylinders 240 with an oil storage tank 248. A BS&W, or waste tank 250 communicates with outer casing 220 through a valved conduit 252.

In an illustrative example, outer casing 220 has a $9\frac{5}{8}$ in. I.D. and is sunk to a depth of 2,500 ft. Conduit 222 has a 7 in. I.D. and extends to a depth of 2,490 ft.; nipple 224 has a 5 in. I.D. Conduit 226 has a 5 in. I.D. and extends downwardly 500 ft. Steam line 228 comprises $2\frac{7}{8}$ in. tubing and extends to a depth of 2,495 ft. Pressure cylinders 240 are 48 ft. high and have an internal diameter of $5\frac{1}{2}$ ft. Steam boiler 226 delivers saturated steam at approximately 300° F. into the well to a depth of approximately 690 feet, whereupon pressure and temperature conditions cause a phase change (to hot water).

With the system initially charged with water, the pressure at the bottom of conduit 222 is about 1080.66 psi. Following initial charging with water, waste oil from tank 230 is pumped into conduit 226. At the same time, steam is injected through the steam line 228 to heat the waste oil.

Waste oil flows initially into the annular space between steam line 228 and conduit 226, and at a depth of 500 feet into the annular space between conduits 226 and 222. The steam flows through line 228 to the well bottom, with a phase change at approximately 690 feet, (vapor to liquid), and returns to the surface via the annular space between casing 220 and conduit 222. Heat is transferred to the waste oil during the downward and upward flow of steam (or hot water). Very little heat is lost to the surrounding media.

BS&W settles, to a large degree, due to heating and pressure differential (pull of gravity and weight of mixture). Oil, with some waste material (primarily water), flows through pipe 242 communicating with casing 222 to the pressure cylinders 240.

After a sufficient period of operation (depending on cylinder capacity, operating schedules, etc.), valved conduits 232 and 246 are closed and the cylinders are pressurized to a pressure large enough (approximately 20 psi) to force backward flow through valved conduit 242. Water, since it is heavier and under pressure, separates from the oil in tanks 240 and returns to the well, and from the well through casing 220 to BS&W tank 250. If pressure is properly controlled, equilibrium between oil and water at the bottom of the well can be achieved and the reverse flow will stop; the system has then reached a static state. The clean oil in pressure cylinder can be moved to storage tanks through displacement, i.e., opening valved conduits 232 and 246 and returning to the waste oil pumping operation.

BS&W at the bottom of the well can be removed by closing valved conduits 232 and 242, and by increasing the steam pressure until the jet action at the outlet of steam line 228 cleans the well bottom, forcing BS&W into tank 250.

In the above-described embodiments, particularly those shown in FIGS. 1 and 2, the source of pressure may be the fluid mixture itself. Thus, tanks 20 or 126 may extend above the ground level to a sufficient height to thereby accommodate a desired volume and height of fluid mixture, determined as a function of the average difference between the densities of the fluids to be separated. The mixture in tank 20 or 126 will then exert a pressure on the fluid in the casing 12 or conduit 122 (in FIGS. 1 and 2, respectively) analagous to the pumping pressure into conduit 26 or air pressure from source 134. For example, if tank 20 (or 126) is an ordinary oil field storage tank or is one of a group of tanks in a tank farm, capable of being filled with an oil/water mixture to a height of 14 feet, essentially no water will accumulate in tank 20 (or 126) and no oil will flow into waste tank 16 (or 130) with an outer casing 12 (or conduit 122) extending down to a depth of about 350 feet.

It is to be noted that, while the preferred embodiments have been described above with respect to reclamation of oil, it should be apparent that this invention can be used to separate other types of mixed fluids.

The invention may be embodied in other specific forms without departing from the spirit or essential characteristics thereof. The embodiments described above are therefore to be considered in all respects as illustrative and not restictive, the scope of the invention being indicated by the hereafter appended claims rather than by the foregoing description, and all changes which come with the meaning and range of equivalency of the claims are therefore intended to be embraced therein.

What is claimed is:

1. A system for separating two immiscible fluids of different densities, comprising:
    an outer conduit extending down from the earth's surface at least to a depth determined as a function of the average difference between the densities of the two fluids to be separated, said outer conduit being effectively sealed at the top and bottom to define a fluid space therewithin;
    an intermediate conduit extending down from the earth's surface inside said outer conduit, the lower end of said intermediate conduit terminating above the bottom of said outer conduit and in open communication with the space defined within said outer conduit;
    an inner conduit extending down from the earth's surface inside said intermediate conduit, said inner conduit opening into said intermediate conduit;
    a mixture supply source coupled to said inner conduit for supplying a mixture of two immiscible fluids to said inner conduit;
    storage tank means coupled to the surface end portion of said intermediate conduit;
    heavy fluid outlet means connected to the surface end portion of said outer conduit for removing the heavier, more dense fluid separated out of said fluid mixture;
    means for maintaining the system under sufficient pressure to maintain a lower end of a defined fluid separation region, below which occurs substantially only the heavier of said two immiscible fluids, within said intermediate conduit and above the lower end of said intermediate conduit;
    wherein said pressure is further sufficient to supplement the weight of the lighter, less dense, fluid to overcome the weight of said heavier fluid and force said heavier fluid to flow out through said outer conduit to said heavy fluid outlet means; and
    means for drawing off the lighter of said two fluids from above an upper limit of said fluid separation region, above which occurs substantially only the lighter of the two immiscible fluids, to and into said storage tank means.

2. A system according to claim 1, further comprising:
    a steam line extending down from the earth's surface inside said inner conduit, the lower end of said steamline terminating above the bottom of said outer conduit; and
    means for supplying steam through said steam line to heat the fluid mixture in said inner conduit.

3. A system according to claim 2, wherein the lower end of said steam line terminates in the space between the bottom of said outer conduit and the lower end of said intermediate conduit.

4. A system according to claim 1 or 2, further comprising:
    at least one pressure tank coupled to the upper end of said intermediate conduit, said storage tank means being coupled to said at least one pressure tank; and
    further pressure supply means for pressurizing said pressure tank to a pressure sufficient to shift said fluid separation region downwardly in said intermediate conduit and thereby forcing said heavier fluid up and through said outer conduit and out said heavy fluid outlet, and to thereby permit said lighter fluid above said upper limit to be drawn out of said pressure tank and into said storage tank.

5. A method for separating two immiscible liquids of different densities by the use of an oil well which has been abandoned, played out or is not otherwise in use, comprising the steps of:
    initially charging an outer conduit which is the casing of a said oil well, said outer conduit extending down from the
        earth's surface at least to a depth determined as a function of the average difference between the densities of the two liquids to be separated, and an inner conduit, which extends down from the earth's surface inside the outer conduit and is in open communication at its bottom with the interior of the outer conduit, with a liquid at least as dense as the denser of the two immiscible liquids to be separated;

thereafter supplying a mixture of said two immiscible liquids to an inlet of one of said outer and inner conduits;

pressurizing the mixture sufficiently (1) to maintain a defined liquid separation region within said one conduit such that the lower limit of the fluid separation region, below which occurs substantially only the heavier of said two immiscible liquids, is maintained above the lower end of said one conduit, and (2) to supplement the weight of the lighter, less dense, liquid of said mixture to force said heavier liquid to flow out through an outlet of the other of said outer and inner conduits; and drawing off the lighter of said two liquids from above the upper limit of said liquid separation region above which occurs substantially only the lighter of said two immiscible liquids.

6. A method according to claim 5, further comprising:

supplying said immiscible liquid mixture to said inner conduit at its surface end portion; and drawing off said heavy liquid at the surface end portion of said outer conduit.

7. A method according to claim 5, or 6 further comprising:

heating the liquid mixture in said liquid separation region an amount sufficient to thin the viscosity of the lighter liquid.

8. A method according to claim 5 or 6, further comprising:

supplying steam through a steam line which extends down from the earth's surface inside said inner conduit and terminates above the bottom of said outer conduit, for supplying steam to heat the liquid mixture in said inner conduit.

9. A method according to claim 8, wherein said pressurizing step further comprises:

pressurizing at least one pressure tank coupled to the upper end of an intermediate conduit, which extends down from the earth's surface inside said outer conduit and terminates above the bottom of said outer conduit in open communication with the space defined within said outer conduit, to a pressure sufficient to shift said liquid separation region downwardly in said intermediate conduit, and thereby forcing said heavier liquid up and through said outer conduit and out the heavy liquid outlet, and to thereby permit the lighter liquid above said upper limit to be drawn out of said pressure tank and into said storage tank.

10. A method according to claim 5 further comprising:

supplying said immiscible liquid mixture to said outer conduit at its surface end portion; and drawing off said heavy liquid at the surface end portion of said inner conduits.

11. The method of claim 5 wherein said outer conduit extends down from the earth's surface to a depth of 500 feet or more.

12. A system for separating two immiscible fluids of different densities, comprising:

an outer conduit extending down from the earth's surface at least to a depth determined as a function of the average difference between the densities of the two fluids to be separated, said outer conduit being effectively sealed at the top and bottom to define a fluid space therewithin;

an inner conduit extending down from the earth's surface inside said outer conduit, the lower end of said inner conduit terminating above the bottom of said outer conduit and in open communication with the space defined within said outer conduit;

a mixture supply source coupled to one of said conduits for supplying a mixture of said two immiscible fluids to said one conduit, said mixture supply source including fluid storage tank means coupled to said one conduit and extending upwardly from the earth's surface at least to a height determined as a function of the average difference between the densities of the two fluids separated, said storage tank means containing a volume of said mixture to a height sufficient to maintain the system under sufficient pressure to maintain a defined fluid separation region within said one conduit such that the lower limit of the fluid separation region, below which occurs substantially only the heavier of said two immiscible fluids, is maintained above the lower end of said one conduit;

wherein said pressure is further sufficient to supplement the weight of the lighter, less dense fluid to overcome the weight of said heavier fluid and force said heavier fluid to flow out through said other conduit and said heavy fluid outlet means; and means for drawing off the lighter of said two fluids from above the upper limit of said fluid separation region, above which occurs substantially only the lighter of said two immiscible fluids.

13. A system according to claim 12, wherein:

said mixture supply source comprises a mixture storage tank coupled to said inner conduit at its surface end portion; and said heavy fluid outlet means is connected to the surface end portion of said outer conduit.

14. A system according to claim 12, or 13, further comprising:

means for heating the fluid mixture in said fluid separation region an amount sufficient to thin the viscosity of the lighter fluid.

15. A system according to claim 12, wherein:

said mixture supply source comprises an above surface tank coupled with said outer conduit at its surface end portion; and said heavy fluid outlet means is connected to the surface end portion of said inner conduit.

16. A method for separating two immiscible liquids of different densities, comprising the steps of:

initially charging an outer conduit, which extends down from the earth's surface at least to a depth determined as a function of the average difference between the densities of the two liquids to be separated, and an inner conduit, which extends down from the earth's surface inside the outer conduit and is in open communication at its bottom with the interior of the outer conduit, with a liquid at least as dense as the denser of the two immiscible liquids to be separated;

thereafter supplying a mixture of said two immiscible liquids to an inlet of one of said outer and inner conduits from liquid storage tank means coupled to said one conduit and extending above the upper portion of said one conduit, a predetermined volume of said mixture being stored in said tank means at least to a height determined as a function of the average difference between the densities of the two liquids to be separated to thereby pressurize the liquid in said one conduit sufficiently (1) to maintain a defined liquid separation region within said one conduit such that the lower limit of the fluid separation region, below which occurs substantially only the heavier of said two immiscible liquids, is maintained above the lower end of said one conduit, and (2) to supplement the weight of the lighter, less dense, liquid of said mixture to force said heavier liquid to flow out through an outlet of the other of said outer and inner conduits; and drawing off the lighter of said two liquids from above the upper limit of said liquid separation region above which occurs substantially only the lighter of said two immiscible liquids.

17. A method according to claim 16, further comprising:
supplying said immiscible liquid mixture to said inner conduit at its surface end portion; and
drawing off said heavy liquid at the surface end portion of said outer conduit.

18. A method according to claim 16, or 17, further comprising:
heating the liquid mixture in said liquid separation region an amount sufficient to thin the viscosity of the lighter liquid.

19. A method according to claim 16, further comprising:
supplying said immiscible liquid mixture to said outer conduit at its surface end portion; and
drawing off said heavy liquid at the surface end portion of said inner conduit.

* * * * *

UNITED STATES PATENT AND TRADEMARK OFFICE
CERTIFICATE OF CORRECTION

PATENT NO. : 4,387,030

DATED : June 7, 1983

INVENTOR(S) : Larry D. Sauder

It is certified that error appears in the above-identified patent and that said Letters Patent is hereby corrected as shown below:

Claim 7 should read as follows and be transposed with Claim 10 so that it would be in the proper sequence:

7. A method according to claim 5,6 or 10 further comprising:
heating liquid mixture in said liquid separation
      region an amount sufficient to thin the viscosity
      of the lighter liquid.

Claim 15 in printed patent should be Claim 14 and read as follows:

14. A system according to claim 12, wherein:
said mixture supply source comprises an above surface tank
      coupled with said outer conduit at its surface end
      portion; and
said heavy fluid outlet means is connected to the surface end
      portion of said inner conduit.

Claim 14 in printed patent should be Claim 15 and read as follows:

15. A system according to claim 12, 13, or 14 further comprising:
means for heating the fluid mixture in said fluid separation
      region an amount sufficient to thin the viscosity of
      the lighter fluid.

UNITED STATES PATENT AND TRADEMARK OFFICE
CERTIFICATE OF CORRECTION

PATENT NO. : 4,387,030

DATED : June 7, 1983

INVENTOR(S) : Larry D. Sauder

It is certified that error appears in the above-identified patent and that said Letters Patent is hereby corrected as shown below:

Claim 19 in printed patent should be Claim 18 and read as follows:

18. A method according to claim 16, further comprising:
supplying said immiscible liquid mixture to said outer conduit at its surface end portion; and
drawing off said heavy liquid at the surface end portion of said inner conduit.

Claim 18 in printed patent should be Claim 19 and read as follows:

19. A method according to claim 16, 17, or 18, further comprising:
heating the liquid mixture in said liquid separation region an amount sufficient to thin the viscosity of the lighter liquid.

Signed and Sealed this

Twenty-fifth Day of October 1983

[SEAL]

Attest:

GERALD J. MOSSINGHOFF

Attesting Officer

Commissioner of Patents and Trademarks